E. FLETCHER.
GRAIN CONFECTION MACHINE.
APPLICATION FILED OCT. 18, 1915.
1,233,335.
Patented July 17, 1917.
3 SHEETS—SHEET 3.
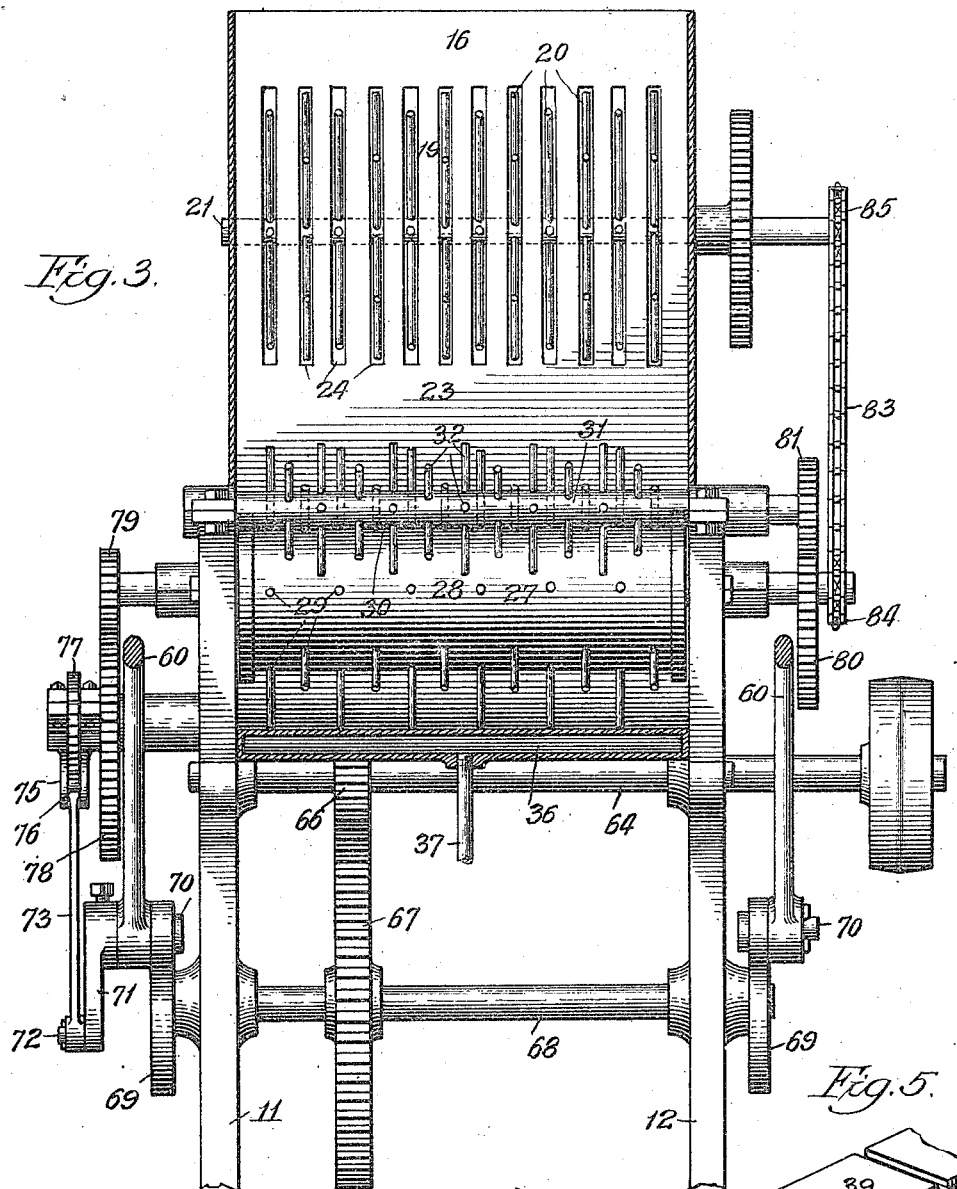
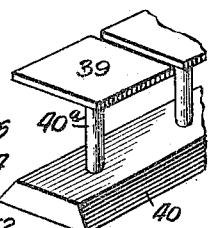
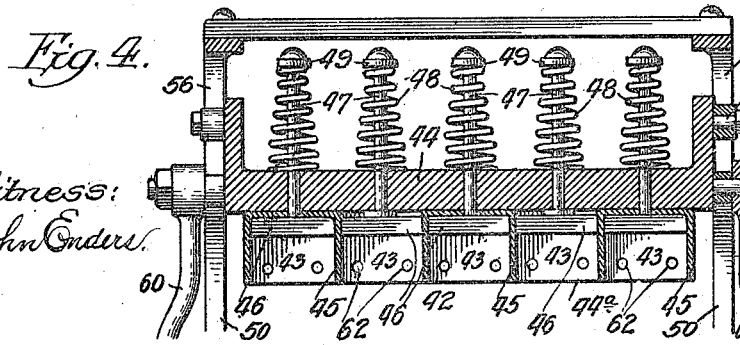
Witness:
John Enders.
Inventor:
Elmer Fletcher
by Fred Gerlach
his Atty.

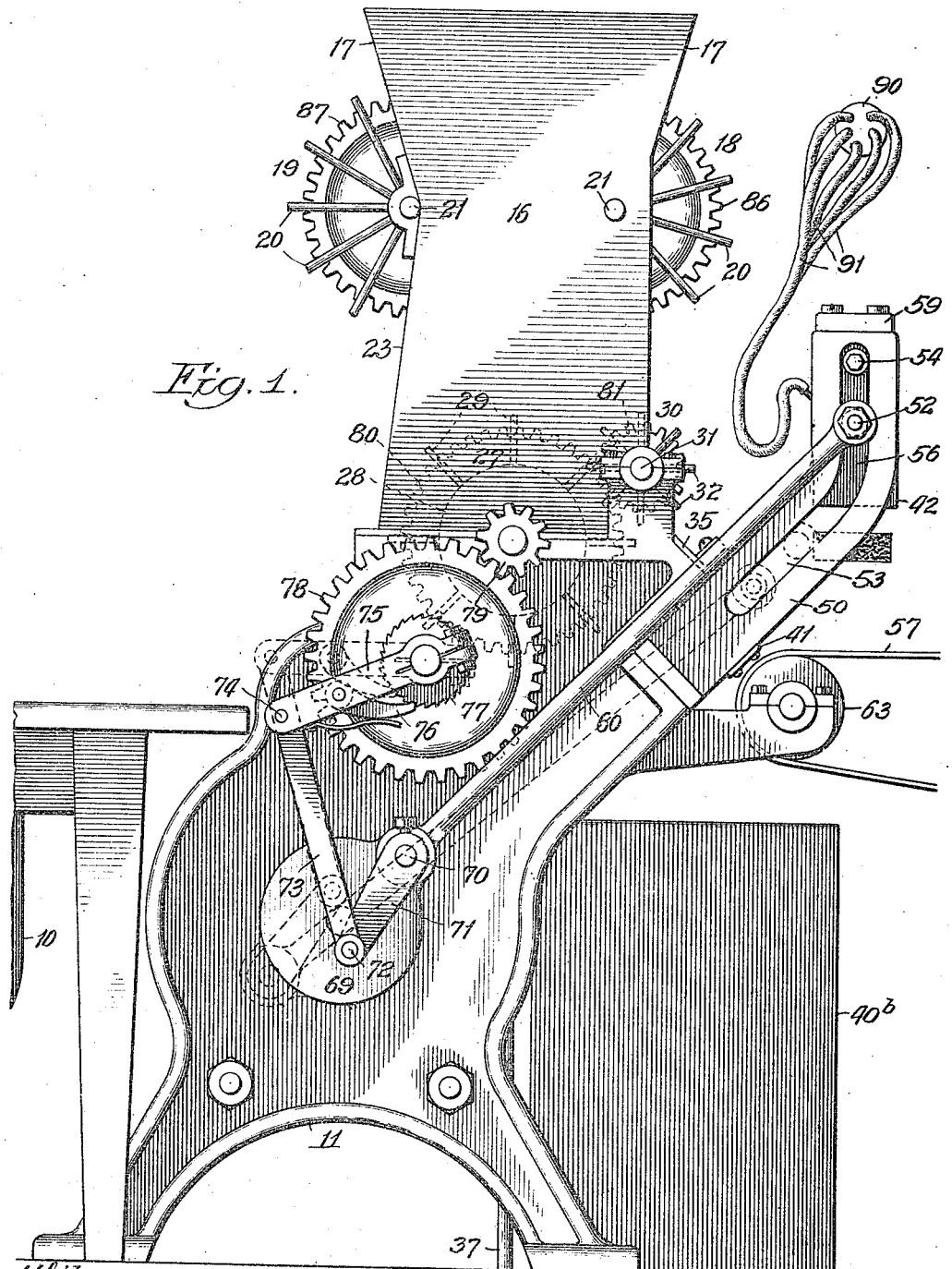

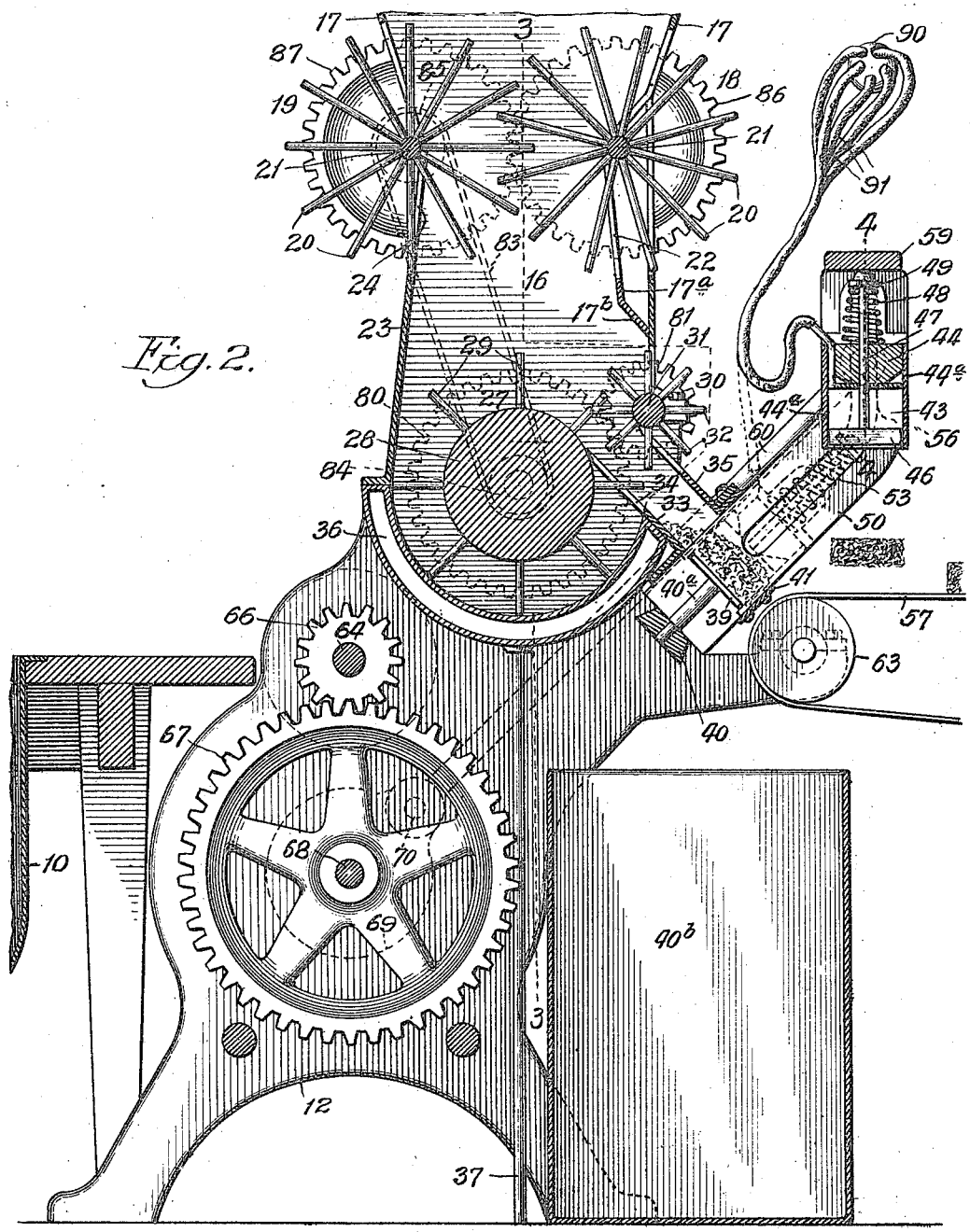

UNITED STATES PATENT OFFICE.

ELMER FLETCHER, OF CHICAGO, ILLINOIS, ASSIGNOR TO THE WELCH COMPANY, OF CHICAGO, ILLINOIS, A CORPORATION OF ILLINOIS.

GRAIN-CONFECTION MACHINE.

1,233,335.  Specification of Letters Patent.  Patented July 17, 1917.

Application filed October 18, 1915. Serial No. 56,378.

*To all whom it may concern:*

Be it known that I, ELMER FLETCHER, a resident of Chicago, in the county of Cook and State of Illinois, have invented certain new and useful Improvements in Grain-Confection Machines, of which the following is a full, clear, and exact description.

The invention relates to machines for making cakes of pop-corn confection consisting of popped corn and a saccharine agglutinant. Heretofore, in molding grain-confections of this sort, it has been found necessary to deliver the confection into the molds or forming devices by hand, as a result of the sticky character of the mixed composition and the inherent difficulty in handling it.

One object of the invention is to provide an improved machine for forming cakes or "crispettes", as they are generally known, which is adapted to receive the popped corn mixed with the syrup while it is hot and in bulk and to properly deliver the material to the molds, without the necessity of manually filling the molds. In other words, to provide a machine for this purpose which is automatic, in that it is adapted to receive the mixed confection in bulk, and delivers the material from the mass in proper quantities to the molds, and to mold the delivered quantities into cakes or crispettes. Another object of the invention is to provide mechanism for feeding a coherent pop-corn confection in substantially regular quantities to molding mechanism, without causing the popped corn to be cut or broken into small fragments.

Another object of the invention is to provide improved molding-mechanism, which is adapted to handle pop-corn or similar grain confections and to automatically discharge the formed cakes onto a conveyer.

Another object of the invention is to provide an improved machine for forming a coherent grain or pop-corn confection into cakes, which is efficient in operation, may be continuously operated, has great capacity and is simple in construction. Other objects of the invention will be apparent from the detailed description.

The invention consists in the several novel features hereinafter set forth and more particularly defined by claims at the conclusion hereof.

In the drawings: Figure 1 is a side elevation of a machine embodying the invention. Fig. 2 is a central longitudinal section. Fig. 3 is a transverse section taken on line 3—3 of Fig. 2. Fig. 4 is a transverse section taken on line 4—4 of Fig. 2. Fig. 5 is a detail of one of the bed-plates for the molds.

The machine comprises a receptacle, such as a hopper for receiving the mixed confection in bulk; mechanism for molding quantities of the confection into cakes and whereby the molded cakes will be discharged; and mechanism for feeding measured quantities of the confection from the bulk in the hopper to the molding mechanism, so that the machine will automatically handle and form it into cakes from the bulk supply in the hopper. In caking this confection, it is desired to give it form and to avoid over densification and crushing or cutting, so far as possible.

The mechanisms are supported by a frame consisting of sides 11 and 12, which are rigidly secured in spaced relation by any suitable means. A hopper 16 extends transversely across and is suitably secured to the top of the frame-sides. This hopper is adapted to receive popped corn which has been mixed with a syrup or binder in bulk. In practice, the syrup or binder is heated and mixed with popped corn in a suitably heated receptacle 10, usually located in close proximity to the hopper, so that it can be quickly delivered into the hopper and formed into cakes while the confection is ductile. In handling a confection of this sort, it is necessary to avoid the loss of time, because when the syrup or binder has become hard, the composition cannot be molded without crushing the popped corn. The walls of the hopper 16 have their upper ends flared, as at 17, to receive the material and direct it between a pair of oppositely disposed coacting rotatable members 18 and 19, which serve to feed the material downwardly and distribute it over the feed-mechanism therebeneath. Each of these members consists of a shaft 21 and a series of radial fingers 20, which are adapted to pick apart the sticky confection and discharge it downwardly in the hopper. Shaft 21 of member 18 is disposed on the outside of a supplemental side-wall 17$^a$ of the hopper and its fingers 20 are adapted to pass through slots 22 formed in said wall, and the slots through which the fingers pass out of the hopper serve to strip the material from the fingers. The shaft 21 of the member 19 is disposed outside of the hopper wall 23 and the latter is provided with slots 24 for the fingers 20 of said member, the slots through which these fingers pass out of the hopper serving to strip the material from or prevent accumulation on the fingers. The side-walls of the hopper, below the shafts of members 18, 19, are divergent, so that the hopper will be flared downwardly below members 18 and 19, to facilitate the passage of the composition to the feed-means. The fingers of members 18, 19, are of sufficient length to lap one another in their rotation to effectively move the material downwardly, and in their rotation, these fingers pick apart the mass and distribute it over the feed-means below. Members 18 and 19 are intermittently driven in opposite directions by mechanism hereinafter set forth. These rotating members 18 and 19 exemplify means for picking apart and forcing the sticky composition from the mass in the upper portion of the hopper to and distributing it over the lower portion of the hopper which is provided with mechanism for delivering the sticky composition to the molding mechanism. In practice, it has been found that when the composition is exceptionally sticky these members are effective in supplying the feed-means.

The feed-mechanism for delivering the sticky composition in substantially uniform quantities to the cake-forming mechanism comprises a rotating member 27 disposed at the bottom of the hopper and consisting of a drum or body 28 and radial fingers 29, and a coacting member 30, disposed adjacent one side of the lower portion of the hopper and consisting of a shaft 31 and radial fingers 32. The fingers 29 of member 27 and the fingers 32 of coacting member 30 are of such length that they will be lapped or move through intersecting paths, to pick or strip the sticky material from the other member, and when moving away from one another, the fingers of each member will cause the sticky composition to be forced and fed regularly from the lower portion of the hopper to the molding-mechanism. An inclined bottom-plate 33 receives material from feed-members 27 and 30 for delivery to the molding mechanism. The inner end of plate 33 is slotted, as at 34, to permit the fingers 29 to pass therethrough and to cause the plate to act as a stripper for or prevent accumulation on the fingers. An inclined stripper plate 35, having slots therein for the forwardly moving fingers 32 of member 30, serves to strip the composition from said fingers. A steam jacket 36 is disposed below member 28 and forms a stationary bottom for the hopper. Steam is supplied to this jacket by a pipe 37 to heat the composition in the hopper.

The supplemental wall 17ª has its lower end inclined outwardly and downwardly, as at 17ᵇ, and this angular portion is disposed above the feed-member 30. This formation of the wall leaves a space above said feed-member, so that there will be no wall immediately above said feed-member to which the confection will adhere to such an extent as to prevent the passage of the material to said feed-member. In other words, if the wall 17ª were extended directly to the top of the feed-wall, there would be a tendency of the material to adhere to that portion of the wall immediately above said member which would retard it and would, at times, prevent the passage of the material to said feed-member.

Members 27 and 30 are driven in opposite directions and are intermittently operated by mechanism hereinafter set forth.

The feed-members 27 and 30 are coactively disposed and their fingers are formed to pick apart, without cutting or crushing, the coherent composition and this is important in regularly feeding popped corn confection to the molds. These members are disposed to force the picked-apart portions of the coherent mass over the guide-plate 33 and the latter is inclined so that gravity will aid the material in passing to the bed of the forming mechanism. In practice, it has been found that this feed-mechanism, constructed as shown, will operate to feed a pop-corn confection regularly to the molding mechanism without materially cutting or crushing the popped corn. In practice, it has also been found that the distributing members 18 and 19 are desirable where the confection is unusually sticky, but it will be understood that the feed-mechanism may be used without the distributing-members, where the character of the composition renders the initial distribution unnecessary.

The mechanism set forth exemplifies one which is adapted to receive a composition of popped-corn and syrup in bulk and to deliver it in substantially regular quantities to cake-forming mechanism without breaking up the popped corn, and is adapted to keep the automatic cake-forming mechanism supplied with the composition from the bulk or mass composition without the necessity of filling the molds by hand.

The molding-mechanism is adapted to form a series of separate crispettes in one operation and is disposed adjacent the inclined plate 33 to which the composition is intermittently fed, and comprises a stationary mold bottom or bed which forms one of the members. This bed is inclined in alinement with plate 33 and consists of a transversely arranged series of separated bottom plates 39, each approximately of the size of the cake to be formed. Each of these plates is secured at the upper end of a post 40ª fixed to a fixed cross-bar 40, suitably secured to the machine-frame. This manner of supporting the bed plates leaves a space beneath them which permits any waste pieces of material to escape to a receptacle 40ᵇ. The composition passing over the plate 33 passes onto bed-plates 39 and is held thereon by a fixed side plate 41 which is rigidly secured to the frame. Plate 33 and plate 41 are spaced from bed-plates 39 and the latter are spaced from each other sufficiently to permit the hollow open-bottomed molds to pass around and below the bed-plates in the molding operation.

The movable molding-member 42 comprises a transverse series of open-bottomed molds 43 corresponding to the transverse series of stationary bed-plates 39 and a cross head 44. U-shaped plates 45 have their bases secured to the cross-head and have sides which form the ends or division walls between the formers 43. The sides of the molds 43 are formed by transverse plates 44ᵃ which are secured to the sides of the head 44. A discharge plunger 46 is slidably mounted in and forms the top of each mold 43. Each plunger 46 is fixed to the lower end of a rod 47 which is slidably mounted in head 44 and is normally held in the upper end of its receptacle by a spring 48 which is interposed between head 44 and a shoulder 49 on the upper end of the stem.

The movable molding-member 42 is slidably and pivotally mounted in a pair of standards 50 which are fixedly secured to the supporting-frame. Roller-studs 52 project from the ends of the head 44, respectively, and extend through slots in standards 50 and roller-studs 54 mounted on lugs on the top of the head 44 respectively, are mounted to travel in said slots. Each of said slots comprises relatively angled lower and upper portions 53, 56, to cause the movable former-member to move to and from the bed in a plane at right angles to the face of the bed, and also in its reciprocations to be swung laterally or oscillated at the end of each stroke, so that the formed cakes will be discharged in front of the bed-plates and onto a drier-belt 57. A bar 59, which is fixed to the standards 50, is disposed to engage the upper ends of the stems 47 of plungers 46 and arrest the plungers while the plunger-head approaches the end of its up-stroke, to force the formed cakes out of molds 43 and to discharge them onto the drier belt. Reciprocating movement is imparted to the movable molding member by links 60 having their upper ends pivotally connected to the studs 52, respectively. During the initial lowering movement of the movable member 42, head 44 and the molds 43 will move downwardly in advance of plungers 46 until the upper ends of the plungers have passed out of engagement with abutment 59, the springs 48 serving to restore the plungers 46 to and hold them in normal position at the upper end of the receptacles. During the initial downward operation of the movable member 42, the head and molds will be swung laterally by the operation of the studs 52, 54 in slots 53, 56, to bring the molds into alinement with the bed-plates 39. During further lowering movement, the composition on the bed-plates will be surrounded by the side and end walls of the molds and then compressed to compact the composition and put it in the desired cake form. In this operation, it is desired to bring the popped corn into closer relation, but not to objectionably densify it, and it is also desirable to avoid cutting, as much as possible, and for that reason, sharp lower edges on the walls of the molds 43 are avoided. During initial upward movement of the molds 43, the compressed cakes remain therein until the molds have passed above plate 41 and then plungers 46 are operated to expel the cakes after the member 42 has been swung laterally to discharge the cakes onto belt-conveyer 57.

The members of the molding mechanism are intermittently brought together to compact the composition and the intermittent feeding operations are effected between the molding operations.

Owing to the sticky character of the compressed composition, it is necessary to prevent the compressed cake from sticking to the bed-plates 39 when the molding members are being separated. For this purpose, means for causing the cakes to remain in the movable member, as exemplified by holes 62 in the walls of the molds 43 are provided. These openings are located in said walls at a point which remains above the bed-plates 39. As the composition is compressed, slight portions thereof will be forced into these holes 62 and this will be sufficient to cause the cakes to be lifted from the bed-plates.

In practice, it has been found that the binding syrup, at the temperature at which it reaches the molds 43, is such that there is great tendency to adhere to the walls of the mold and that by cooling the walls of the mold, there is less tendency for the material to adhere thereto. For the purpose of lessening the tendency of the material to adhere to the walls of the mold, cooling means is provided for said walls, as exemplified by a manifold 90, which is connected to receive air from a compressor or pump (not shown) and flexible tubes 91 leading from the manifold to the receptacles 43, respectively. During the initial operation of the downstroke of the movable mold-member, a charge of cold air from the compressor will be delivered into the upper portions of the receptacles, and will escape around the margins of the plungers 46 and in passing through the molds, their walls will be cooled sufficiently to prevent excessive adhesion of the material to the mold-walls.

The endless drier belt 57 passes around a drum 63 which is mounted in close proximity to the molding mechanism, and in practice the belt is driven to cause the cakes to be removed as fast as they are deposited thereon by the molding-mechanism and is of sufficient length so that the cakes will be in sufficiently dry condition to be wrapped when they are discharged from the belt.

The mechanism for driving the several parts of the machine comprises a shaft 64, which is journaled in the machine-frame, and has power applied thereto in any suitable manner. A pinion 66 is fixed on the shaft 64 and meshes with a gear-wheel 67 on a shaft 68, which is also journaled in said frame. Crank-disks 69 are secured to the ends of shaft 68 and are provided with wrist pins 70 to which the lower ends of the links 60, for operating the molding-mechanism, are pivotally connected. This mechanism serves to alternately raise and lower the movable member of the molding-mechanism, and such operation causes said member to swing laterally under control of studs 52, 54 and the angular slots in standards 50.

An arm 71, rigid with one of the wrist-pins 70, carries a pin 72, which is eccentric with respect to the axis of shaft 68 and operates a pitman 73 which has one of its ends pivoted to pin 72 and its other end pivoted, as at 74, to an arm 75. The latter carries a pawl 76 which intermittently operates a ratchet 77 which is secured to rotate a gear 78. The latter meshes with a pinion 79 which is secured to the drum 28 of the rotary-feed-member 27. Movement is transmitted from feed-member 27 to its coacting feed-member 30 by a gear 80 fixed to the shaft of drum 28 and meshing with a gear-pinion 81, which is fixed to the shaft 31 of feed-member 30. The gears between feed-members 27 and 30 are proportioned to cause the fingers of the upper feed-member to travel faster than the fingers on the lower-member, and this coöperative action causes the fingers on the upper member to pick apart the cohesive portions of the material and project or kick it toward the bed-plates 39.

A chain 83 between a sprocket wheel 84 rotating with the drum 28 and a sprocket wheel 85 on the shaft 21 of distributer member 19, serves to drive said member. Gear wheels 86 and 87 on shafts 21 of the members 18 and 19, respectively, serve to drive distributer-member 19.

During the movement of the pitman 73 in one direction, pawl 76 will operate ratchet-wheel 77 to drive all parts of the feed-mechanism and during the movement of pitman 73 in the opposite direction, the feed-mechanism will remain idle. This exemplifies mechanism by which the feed-members will be synchronously and intermittently operated to deliver substantially regular quantities of said confection to the molding mechanism adapted to receive the composition from the delivery mechanism, which receives the composition in bulk. The driving-mechanism for the molding-mechanism and the feed-mechanism are relatively timed, so that the composition will be fed to the molding mechanism while its members are in separated relation.

In operation, assuming shaft 68 to be continuously driven, the downward movement of pitman 73 will cause a regular quantity of the composition to be delivered by coacting feed-members 27 and 30 onto the platforms 39 where it will be held by plate 41. This operation occurs while the molding member 42 is separated from the bed. During reverse movement of pitman 73, the feed mechanism will remain idle and the molding-member 42 will be operated downwardly to initially confine the composition in the molds and then compact the material in the molds 43 into cakes. This composition is designed to bring the pop-corn into closer relation without, however, objectionally densifying it. During the upstroke of the molding-member 42, the cakes will remain in the molds and will be moved away from end-plates 39. As said member 42 approaches the end of its upstroke, it will be swung laterally under control of studs 52, 54 in the angular slots in standards 50 to move the molded cakes away from the bed-plates and into position to be deposited onto the drier belt 57, and plungers 46 will be operated to discharge the cakes from the molds 43. Continuous operation of the machine results in substantially regular charges of material being delivered to the molding-mechanism and the formation of that material into cakes during alternate half revolutions of shaft 68. Obviously, it is only necessary to keep the hopper 16 supplied with bulk composition in order to keep the machine in continuous operation.

The invention exemplifies a machine which is adapted to form a composition, consisting of popped corn or other grain and a syrup acting as a binder, into cakes and in which devices are provided which avoid the necessity of manually and individually filling each mold. The mechanism is adapted to deliver substantially regular quantities of this sticky composition which, in practice, is very difficult to handle, to the molding mechanism. The invention also exemplifies a machine embodying molding-mechanism for a composition of this peculiar character, having a large capacity, particularly when the composition is automatically delivered thereto. The invention also exemplifies molding mechanism which is adapted to deliver the formed cakes onto a conveyer which removes them so that manual removal of the cakes from the molding mechanism is obviated.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a machine of the class described, the combination of molding mechanism for the composition comprising a stationary mold bottom upon which the molding operation is perfected, a stationary receptacle adapted to receive the composition in bulk, and feed-means comprising coacting picker members for delivering charges of the material from the coherent mass in the receptacle directly to the mold bottom of the molding mechanism.

2. In a machine of the class described, the combination of molding mechanism for the composition comprising a stationary mold bottom upon which the molding operation is perfected, a stationary receptacle adapted to receive the composition in bulk, and intermittently operated feed-means comprising coacting picker members for delivering charges of material from the coherent mass in the receptacle directly to the mold bottom of the molding mechanism.

3. In a machine of the class described, the combination of molding mechanism for the composition, a receptacle adapted to receive the composition in bulk and having a discharge opening at one side thereof, and feed-means for the composition comprising coacting rotary members for delivering charges of the material from the coherent mass in the receptacle for delivery to the mold of the molding mechanism, one of said members being disposed at the bottom of said receptacle, and the other at one side thereof.

4. In a machine of the class described, the combination of molding mechanism for the composition, a receptacle adapted to receive the composition in bulk and having an outlet in its side, and a pair of co-acting feed-members disposed at and extending into said outlet, each having fingers for picking material from the mass in the receptacle and discharging it through the outlet to said mechanism.

5. In a machine of the class described, the combination of molding mechanism for the composition, a receptacle adapted to receive the composition in bulk and having an outlet adjacent its bottom and in one side thereof, and a pair of coacting feed-members disposed at said outlet, each having fingers for picking material from the mass in the receptacle and discharging it through the outlet to said mechanism, one of said members being disposed at the bottom of the hopper and the other in said outlet.

6. In a machine of the class described, the combination of molding mechanism for the composition, a receptacle adapted to receive the composition in bulk, and feed-means for the composition comprising a pair of coacting rotary members, each having fingers for picking material from the mass in the receptacle, and driving-mechanism for said members whereby they will be driven at different speeds.

7. In a machine of the class described, the combination of molding mechanism for the composition, a receptacle adapted to receive the composition in bulk, and feed-means for the composition comprising a pair of coacting rotary members, each having fingers for picking material from the mass in the receptacle, and intermittent driving-mechanism for said members whereby one of them will be driven at a different speed from the other member.

8. In a machine of the class described, the combination of molding mechanism for the composition, a receptacle adapted to receive the composition in bulk, and having a discharge opening in its side and feed-means for the composition comprising a pair of coacting rotatable members, each having fingers for picking material from the mass in the receptacle, one of said members being disposed at the bottom of the receptacle and the other at one side of the receptacle, and driving-mechanism for said members whereby the side member will be driven at a greater speed than the bottom member.

9. In a machine of the class described, the combination of molding-mechanism for the composition, a receptacle adapted to receive and for containing the composition in bulk and having a discharge opening in its side, coacting members having fingers for picking charges of the material from that in the receptacle for delivery to the forming mechanism, one of said members being disposed at the bottom of the receptacle, and members provided with fingers for distributing the material passing to the feed-means.

10. In a machine of the class described, the combination of molding mechanism for the composition, a receptacle adapted to receive the coherent composition in bulk, a pair of coacting distributing wheels each comprising fingers and a body to which the fingers are secured, the bodies of said wheels being disposed outside of the receptacle, the latter having slots through which the fingers will pass into and out of the receptacle, and feed-means below the distributing means.

11. In a machine of the class described, the combination of molding mechanism for the composition, a receptacle adapted to receive the coherent composition in bulk, a pair of coacting distributing wheels, each comprising fingers and a body, the bodies of said wheels being disposed outside of the receptacle, the latter having slots through which the fingers will pass into and out of the receptacle, feed-means below the distributing-means, and means for conjointly and intermittently driving the feed-means and the distributing-means.

12. In a machine of the class described, the combination of molding mechanism comprising an inclined bed and a coöperating hollow member reciprocable into and out of operative relation with the bed to mold a cake, means at the lower side of the inclined bed for holding the material on the bed, means adjacent the elevated side of the bed and adapted to feed material to the inclined bed, and mechanism for operating the hollow member and the feed means.

13. In a machine of the class described, the combination of molding-mechanism comprising an inclined bed and a coöperating hollow member reciprocable into and out of operative relation with the bed to mold a cake, means at the lower side of the inclined bed for holding material on the bed, means adjacent the elevated side of the bed to feed the material to the inclined bed, mechanism for operating the hollow member and the feed-means, and means for discharging the cake from the hollow member.

14. In a machine of the class described, the combination of molding mechanism comprising an inclined bed and a coöperating hollow member reciprocable into and out of operative relation with the bed to mold a cake, means at the lower side of the inclined bed for holding the material on the bed, feed-means adjacent the upper side of the bed and adapted to feed the material to the inclined bed, and mechanism for reciprocating the hollow member and intermittently operating the feed-means.

15. In a machine of the class described, the combination of molding mechanism comprising a bed plate and a coöperating hollow member reciprocable into and out of operative relation with the bed plate, the surrounding walls of the hollow member being adapted to pass around and beyond the bed-plate in the molding operation, a space being formed beneath the bed-plate for the escape of waste material, and mechanism for operating the hollow member.

16. In a machine of the class described, the combination of molding mechanism comprising a bed plate and a coöperating hollow member reciprocable into and out of operative relation with the bed plate, the surrounding walls of the hollow member being adapted to pass around and beyond the bed-plate in the molding operation, a space being formed beneath the bed-plate for the escape of waste material, mechanism for operating the hollow member, and means for discharging the cake from the hollow-member.

17. In a machine of the class described, the combination of molding mechanism comprising an inclined bed plate and a coöperating hollow member reciprocable into and out of operative relation with the bed plate, the surrounding walls of the hollow member being adapted to pass around and beyond the bed-plate in the molding operation, a space being formed beneath the bed-plate for the escape of waste material, means adjacent the lower side of the bed plate for holding material thereon and mechanism for operating the reciprocable member.

18. In a machine of the class described, the combination of coöperating molding members, one of said members being reciprocable in a right line and in an inclined direction into and out of operative relation with the other and laterally movable transversely to the line of reciprocation when the members are separated to discharge a molded cake at one side of the other member, and mechanism for operating the movable member.

19. In a machine of the class described, the combination of coöperating molding-members, one of said members being reciprocable in a right line and in an inclined direction into and out of operative relation with the other and laterally movable transversely to the line of reciprocation when the members are separated to permit a molded cake to be discharged by one member at one side of the other member, means for discharging the formed cake from the hollow member, and mechanism for operating the movable member.

20. In a machine of the class described, the combination of coöperating molding members, one of said members being stationary and the other being reciprocable in a right line into and out of operative relation with the other and laterally movable transversely to the line of reciprocation when the members are separated to discharge a molded cake at one side of the stationary member, means for discharging the formed cake from the movable member, mechanism for operating the movable member, and means for feeding material to be molded onto the stationary member.

21. In a machine of the class described, the combination of molding mechanism comprising an inclined bed, and a coöperating hollow member reciprocable in a right line and in a plane perpendicular to the bed and movable transversely to the line of reciprocation when it has been separated from the bed, to discharge a molded cake at one side of the bed, and mechanism for operating the movable member.

22. In a machine of the class described, the combination of molding mechanism comprising an inclined bed, and a coöperating hollow member reciprocable in a right line and in a plane perpendicular to the bed and movable transversely to the line of reciprocation to a substantially vertical position when it has been separated from the bed to discharge a molded cake downwardly at one side of the bed, and mechanism for operating the movable member.

23. In a machine of the class described, the combination of molding mechanism comprising an inclined bed, and a coöperating hollow member reciprocable in a right line and in a plane perpendicular to the bed and movable transversely to the line of reciprocation when the member has been separated from the bed to discharge a molded cake at one side of the bed, mechanism for operating the movable member, and means for feeding material to be molded onto the bed.

24. In a machine of the class described, the combination of molding mechanism comprising a pair of coöperating members for molding a composition into cakes, one of which is hollow and reciprocable in a right line into and out of operative relation with the other and laterally movable to discharge a formed cake at the side of the other member, and mechanism for alternately reciprocating and moving the movable member laterally.

25. In a machine of the class described, the combination of molding mechanism comprising a pair of coöperating members for molding a composition into cakes, one of which is hollow and reciprocable in a right line into and out of operative relation with the other and laterally movable to discharge a formed cake at the side of the other member, mechanism for alternately reciprocating and moving the movable member laterally, and means for intermittently feeding material to be molded onto one of said members, while the movable member is discharging a formed cake.

26. In a machine of the class described, the combination of molding mechanism comprising a stationary bed and a coöperating reciprocable hollow member having its lower end open, mechanism for reciprocating said member, means in the hollow member for causing the molded cake to remain therein when the member is lifted away from the bed but permitting its positive discharge, and means for discharging the formed cake downwardly through the open lower end of the hollow member.

27. In a machine of the class described, the combination of molding mechanism comprising a stationary bed and a coöperating reciprocable hollow member having its lower end open, mechanism for reciprocating said member, means in the hollow member for causing the molded cake to remain therein when the member is lifted away from the bed but permitting its positive discharge, means for discharging the formed cake downwardly through the open lower end of the hollow member, and means for feeding material to be molded onto the bed while the hollow member is raised.

28. In a machine of the class described, the combination of molding mechanism comprising a stationary bed and a member reciprocable in a right line into and out of operative relation with the bed and movable laterally with respect to its line of reciprocation to discharge a formed cake at one side of the bed, means for feeding charges of material onto said bed, conveying-means disposed to receive the cakes discharged from said member and terminating adjacent one side of the bed, and mechanism for operating said member.

29. In a machine of the class described, the combination of molding mechanism comprising an inclined bed and a member reciprocable in a right line and in a plane perpendicular to the inclined bed into and out of operative relation with the bed and movable laterally with respect to its line of reciprocation to discharge a formed cake at one side of the bed, conveying means disposed to receive the cakes discharged from said member and terminating adjacent one side of the bed, and mechanism for operating said member.

30. In a machine of the class described, the combination of molding mechanism comprising a bed and a member reciprocable in a right line and into and out of operative relation with the bed and movable laterally with respect to its line of reciprocation to discharge a formed cake at one side of the bed, an endless conveyer disposed beneath the movable member when the latter has been moved laterally, to receive the cakes discharged from said member and terminating adjacent one side of the bed, and mechanism for operating said member.

31. In a machine of the class described, the combination of molding mechanism comprising a fixed bed and a coöperating hollow upper member having its lower end open, and reciprocable into and out of operative relation with the bed, the surrounding walls of the upper member being disposed to pass downwardly around and beyond the bed in the molding operation, a discharge-plunger in the upper member, and mechanism for reciprocating the upper member.

32. In a machine of the class described, the combination of molding mechanism comprising a fixed bed, stationary means adjacent one side of the bed for holding material on the bed and spaced from the bed to permit a wall of the upper member to pass, and a coöperating hollow upper member having its lower end open, and reciprocable into and out of operative relation with the bed, the surrounding walls of the upper member being disposed to pass downwardly around and beyond the bed in the molding operation, a discharge plunger in the upper member, and mechanism for reciprocating the upper member.

33. In a machine of the class described, the combination of molding mechanism comprising a row of bed-plates separated from one another, and an upper member provided with molds having their lower ends open and surrounding walls adapted to lap the edges of the bed-plates, a discharge plunger in each upper member, means above the plungers for operating them to discharge the molded material, and mechanism for operating the upper member to and from the bed-plates.

34. In a machine of the class described, the combination of molding mechanism comprising a row of bed plates separated from one another, a holder plate at one side of and separated from said bed plates, and an upper member provided with molds having their lower ends open and surrounding walls formed to lap the edges of the bed-plates and to pass between the bed-plates and between the latter and the holder plate, a plunger in each mold, means above the upper member for operating the plungers in the molds, and mechanism for operating the upper member to and from the bed-plates.

35. In a machine of the class described, the combination of molding mechanism for the composition, a receptacle adapted to receive and for containing the composition in bulk, and feed-means for the composition comprising coacting rotary members for picking the material apart and feeding it to the molding mechanism, the receptacle being provided with a side wall above one of the members, said wall being extended outwardly at a point above said member to leave a space above the latter member.

36. In a machine of the class described, the combination of molding-mechanism for the composition, a receptacle adapted to receive and for containing the composition in bulk and feed-means for the composition comprising coacting rotary members for picking the material apart and feeding it to the molding-mechanism, one of said members being disposed at the bottom of the receptacle, and the other above the bottom member, the receptacle being provided with a side wall above the upper member, said wall being extended outwardly at a point above said upper member to leave a space above the upper member.

37. In a machine of the class described, the combination of molding mechanism comprising a pair of members, one of the members being provided with a molding receptacle, means for injecting a cooling medium into said receptacle to lessen the adhesion of the composition to said walls, and mechanism for operating one of the members of the molds.

38. In a machine of the class described, the combination of molding mechanism comprising a pair of members, one of the members being provided with molding receptacles, means for discharging a cooling fluid into the receptacles to lessen the adhesion of the composition to said walls, and mechanism for operating one of the members of the molds.

ELMER FLETCHER.

Copies of this patent may be obtained for five cents each, by addressing the "Commissioner of Patents, Washington, D. C."